(12) United States Patent
Kane

(10) Patent No.: US 9,671,054 B1
(45) Date of Patent: *Jun. 6, 2017

(54) DEVICE FOR SEALING A FLUID DELIVERY SYSTEM AND METHOD

(71) Applicant: Patrick E. Kane, Laguna Niguel, CA (US)

(72) Inventor: Patrick E. Kane, Laguna Niguel, CA (US)

(*) Notice: Subject to any disclaimer, the term of this patent is extended or adjusted under 35 U.S.C. 154(b) by 80 days.

This patent is subject to a terminal disclaimer.

(21) Appl. No.: 14/658,049

(22) Filed: Mar. 13, 2015

Related U.S. Application Data

(62) Division of application No. 13/625,143, filed on Sep. 24, 2012, now Pat. No. 9,289,862.

(51) Int. Cl.
*F16L 55/165* (2006.01)
*F16L 55/18* (2006.01)

(52) U.S. Cl.
CPC ............. *F16L 55/165* (2013.01); *F16L 55/18* (2013.01)

(58) Field of Classification Search
CPC ....... B29C 63/34; B29C 63/346; F16L 55/165
See application file for complete search history.

(56) References Cited

U.S. PATENT DOCUMENTS

| | | | |
|---|---|---|---|
| 3,700,268 A * | 10/1972 | Nielsen, Jr. | F16L 33/224 285/249 |
| 5,564,863 A | 10/1996 | Reber | |
| 5,650,103 A | 7/1997 | Perkins et al. | |
| 6,857,451 B1 | 2/2005 | Connor et al. | |
| 7,270,150 B2 | 9/2007 | Warren | |
| 9,289,862 B2 * | 3/2016 | Kane | B23P 11/00 |
| 2004/0173272 A1 | 9/2004 | Yoo et al. | |
| 2007/0031194 A1 | 2/2007 | Driver et al. | |
| 2008/0213047 A1 | 9/2008 | Bryant et al. | |
| 2008/0236692 A1 | 10/2008 | Kiest | |
| 2009/0080980 A1 | 3/2009 | Cohen | |
| 2010/0012214 A1 | 1/2010 | Kamiyama et al. | |
| 2010/0139799 A1 | 6/2010 | Kamiyama et al. | |
| 2010/0212766 A1 | 8/2010 | Kiest | |
| 2010/0263759 A1 | 10/2010 | Maimets et al. | |

* cited by examiner

*Primary Examiner* — Benjamin Fiorello
(74) *Attorney, Agent, or Firm* — Plager Schack LLP

(57) ABSTRACT

A device for semi-permanently sealing a leaking fluid delivery system comprising generally cylindrical resilient tubing comprising a material that permits delivery through a portion of a fluid delivery system at a first diameter and application to an interior wall of the fluid delivery system at a second diameter when exposed to temperature and pressure gradients, and further configured to undergo a change from the second diameter to a third diameter when exposed to reduced pressure to enable removal of the cylindrical resilient tubing from the fluid delivery system for replacement by a second length of generally cylindrical resilient tubing that permits delivery at a first diameter and application to an interior wall of the at least a portion of the fluid delivery system at a second diameter when exposed to temperature and pressure gradients.

2 Claims, 7 Drawing Sheets

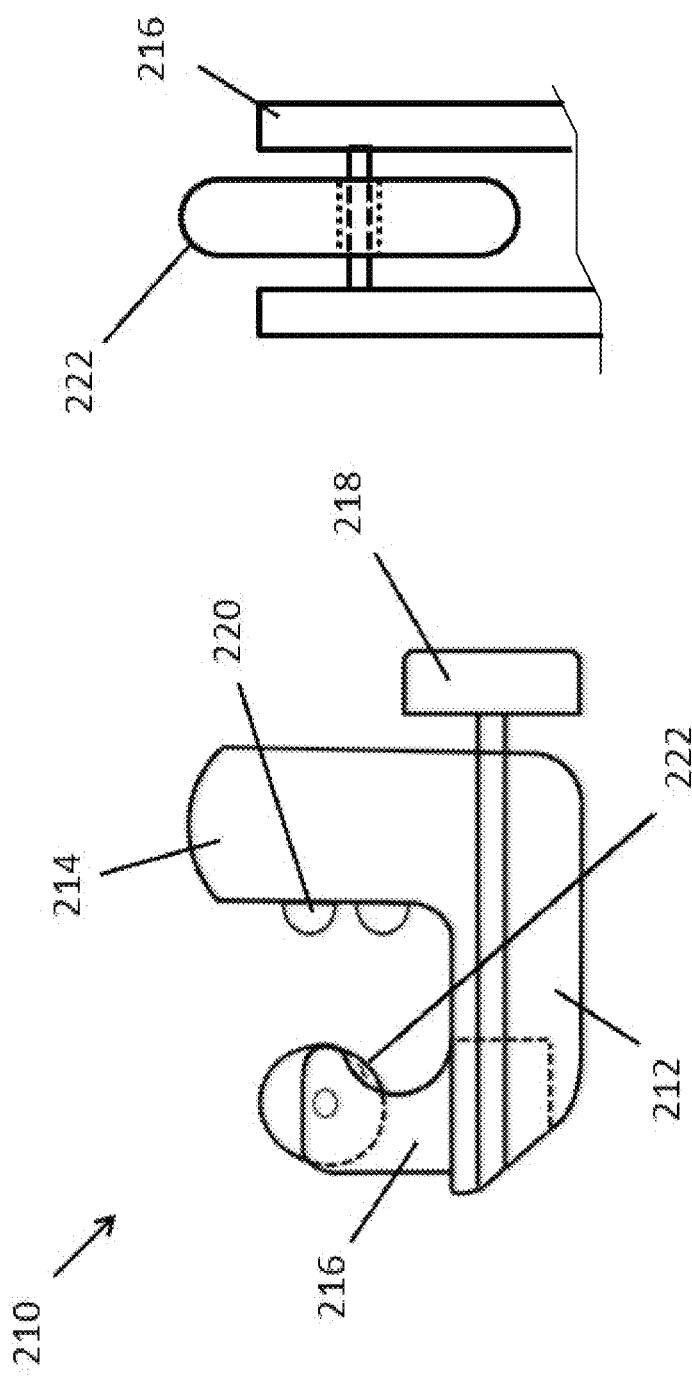

DEVICE FOR SEALING A FLUID DELIVERY SYSTEM AND METHOD

CROSS-REFERENCE TO RELATED APPLICATIONS

This divisional application claims priority under 35 U.S.C. §119(e) to non-provisional U.S. application Ser. No. 13/625,143, filed on Sep. 24, 2012, the disclosure of which is expressly incorporated by reference herein in its entirety.

FIELD OF THE INVENTION

The claimed invention relates to a method of repairing a fluid delivery system without either excavating a subterranean pipe, or exposing pipe encased within a concrete foundation or wall structure.

BACKGROUND OF THE INVENTION

This invention provides a low cost, permanent solution for repairing a fluid delivery system which may be above ground, subterranean, in and under concrete, or within a wall structure. A fluid delivery system includes but is not limited to pipes and storage tanks. This method of repair eliminates the loss of water pressure and volume associated with other repair methods currently in use. This invention also eliminates the necessity of excavating pipes, breaking open concrete slabs or walls to effectuate necessary repairs. A brief description of the most popular and common types of leak repair methods currently available are discussed below, along with their shortcomings solved by the claimed method.

Repiping—

The process of repiping a residence requires substantial demolition to create access in the residential structure to install new fluid delivery system. Currently a home can be re-piped with a combination of rigid and soft copper tubing and associated fittings normally sweated at manifold junctions. Also where approved, re-piping using PEX™ (a crossed linked polyethylene tubing) can be performed with the final connections being made using conventional sweated fittings at PEX™/copper grafts, and brass or plastic press on high-pressure connectors. This repiping is expensive and disruptive to the homeowner, including the creation of excessive amounts of dust and debris.

Pipe Bypass—

Alternatively, a pipe bypass may be used to re-route new pipes around or away from the leaking segment. A pipe bypass requires extensive structural damage to create a new path behind the walls to accommodate the bypass line. Generally, a loss of hot water generation and recovery is noticed due to the placement of the bypass piping in a less than thermally ideal location. For bypass lines created outside concrete slabs to repair leaking hot water pipes encased in a concrete slab the beneficial insulation of the slab encasement is lost resulting in cooler water, or increase energy expenditures to compensate for the lost heat when piped outside the slab.

Localize Repair—

There is also currently the option of repairing a fluid delivery system locally. Localized repair requires location of the leak, excavation or exposure of the leaking system, removal of the offending piece, replacement, and backfill excavation. Instance of the damaged system occurring under a concrete slab, the slab must be re-poured. Likewise, localized repairs within a wall structure requires repairing the wall upon completion of the repair. Localize repairs are not typically performed on steel reinforced (post and pre-tensioned slabs) due to the possibility of damaging in situ reinforcement cables. Moreover, this method only addresses where a leak actually occurs, leaving the remainder of the pipe untouched, and susceptible to future leaks. This form of repair is both expensive and creates excessive debris and dust due to the excavation.

Expoxy Coating—

As a preventative measure against leaks, most pipes are currently coated with a thin layer of epoxy. The process of coating pipes with epoxy is not effective for repairing active leaks. Any leaks must be repaired first before proceeding to the coating phase. It is assumed that all tubing surfaces that come into contact with the liquid coating receive a continuous thickness film deposit on the internal wall. This process relies on a liquid polymer matrix that is injected into the supply tubes as a means to reinforce weak and failing pipes. Its success is predicated on following strict guidelines of pipe preparation and stringent process controls. Studies of pipe cross-sections indicate lack of or marginal coating when this method is used. It has been noted that if process failure occurs the injected mass of polymer contained in the pipes hardens at an uncontrollable rate plugging the entire water supply system and rendering it useless. Non-existent or reduced water volume and pressure occurs. A failure of this magnitude requires a complete house re-pipe or at the minimum multiple bypass lines installed to reroute around the offending blockages. It should also be noted that once a home has been treated using this method, traditional plumbing repairs can no longer be used. Alternate methods and procedures must be used to protect the polymer coating within the pipe if a future repair is required.

SUMMARY OF THE INVENTION

The claimed device for sealing a fluid delivery system comprises a length of generally cylindrical resilient tubing configured to be delivered through at least a portion of the fluid delivery system. The tubing comprises a material that permits delivery at a first diameter and application to an interior wall of the fluid delivery system at a second diameter when exposed to temperature and pressure gradients. A barrel apparatus is utilized to secure each end of the tubing to the supply and discharge ends of the fluid delivery system. The apparatus for sealing a fluid delivery system comprises a pressurization unit to pressurize fluid passed through a length of generally cylindrical resilient tubing configured to be delivered through at least a portion of the fluid delivery system. The apparatus further comprises a heater to elevate the temperature of a fluid circulated through the tubing to mold it to the inside diameter of the fluid delivery system and chiller to decrease the temperature of the fluid circulated through the fluid delivery system to fix the tubing to the inside diameter of the fluid delivery system.

The method for sealing a fluid delivery system comprises threading a generally cylindrical resilient tubing through the fluid delivery system. The tubing is then secured at each of the fluid delivery system. Once secured at each end, the tube is further secured within the system by crimping fluid delivery system and tube against the barrel. The tubing is next filled with heated fluid to mold the tubing to the inside diameter of the fluid delivery system, and then cooled to set it within the fluid delivery system.

BRIEF DESCRIPTION OF THE DRAWINGS

The accompanying drawings, which are included to provide further understanding of the present disclosure, are incorporated in and constitute part of this specification, illustrate aspects of the present disclosure and together with the detailed description serve to explain the principles of the present disclosure. No attempt is made to show structural details of the present disclosure in more detail than may be necessary for a fundamental understanding of the present disclosure and the various ways in which it may be practiced. In the drawings:

FIG. 5A depicts the crimping apparatus.

FIG. 5B depicts the crimping wheel of the crimping apparatus.

DETAILED DESCRIPTION OF THE PRESENT INVENTION

As used herein, the following terms are defined as follows:

O-D means Outside Diameter.

I-D means Inside Diameter

HDPE means High Density Polyethylene

PEX—Trade Name of Cross Linked High Density Polyethylene Tubing

Type K—Deep Bury Exterior (PE) Coat Soft Copper Tubing (ref. only)

Type L—Residential Potable Water Soft Copper Tubing

Swage—A method for increasing I-D/O-D

Rolling/Crimping—A method for reducing tube I-D/O-D

PTFE Paste—Commercially available Teflon reinforced paste applied to plumbing joint to lubricate and seal.

Exothermic—A chemical reaction process between 2 polymeric components at room temperature causing heat as a byproduct and the component mass to harden or a blended component recipe with a latent catalyst that hardens when exposed to elevated temperature causing heat as a by product and the component mass to harden.

Pulling Aid means a small diameter metallic or not metallic device that is typically 100' to 250' long to insert into the tubes being repaired that can be attached to a pulling aid known in this document as "pull dawg" that once attached is used to pull the thin wall HDPE tube liner into position.

Fluid means either a liquid or gas.

Figure 1:
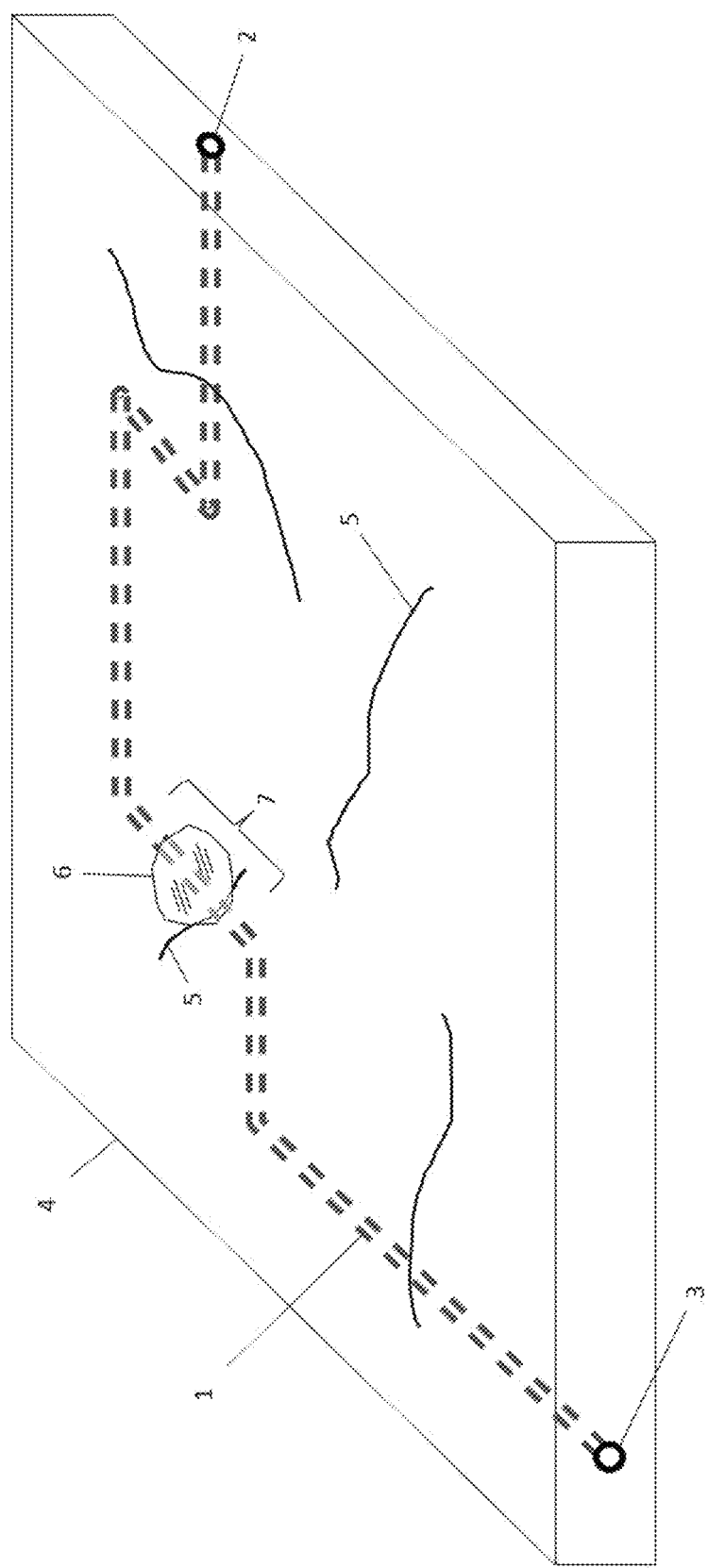
FIG. 1 depicts a fluid delivery system embedded in a concrete slab exhibiting a leak.

This invention is a permanent, low cost and non-invasive repair method utilizing specially designed and manufactured thin-wall high-density polyethylene tubing or an equivalent material with similar properties (10) with uniquely engineered termination fittings (20) to line existing fluid delivery systems located above ground, below ground, or within a concrete slab. Referring to FIG. 1, an existing piping system (1) having a first exposed end (2) and a second exposed end (3), where the piping system (1) is contained within a slab (4) having cracks (5) therein. A puddle (6) has formed around one crack, suggesting that a leaking pipe exists. A section of the pipe (7) is likely where the leak exists.

This repair can be done multiple times in the event a subsequent leak occurs after an initial repair. Thickness of the thin wall HDPE tube liner or equivalent tube liner (10) reflects a negligible decrease in cross section of pre insertion (0.020" wall) to post insertion (0.017" wall). Currently, and as per Table 1, five different thin wall HDPE liner tubes (10) are defined, however, materials possessing equivalent properties may be substituted by persons possessing ordinary skill in the art.

TABLE 1

HDPE LINER/COMP FITTING SIZE CHART
For Type "L" Copper tube
(All Dimensions in Inches)

| Nominal Tube Size | O.D. Tube Size | Type L Copper Tube I.D. | HDPE Size Range O.D.-I.D. | Comp. Fitting Size/Brass Barrel Size |
|---|---|---|---|---|
| .375 (3/8) | .500 | .430 | .365-.390 | 1/2-.363 |
| .500 (1/2) | .625 | .545 | .465-.505 | 5/8-.463 |
| .625 (5/8) | .750 | .668 | .568-.628 | 3/4-.563 |
| .750 (3/4) | .875 | .785 | .665-.725 | 7/8-.663 |
| 1.00 (1) | 1.125 | 1.025 | .905-.965 | 1-.900 |

The diameters as represented small to large would decrease inner diameter (I-D) tube diameter cross-section by 0.03"-0.05", this equates to less than 10% of water flow reduction after repair utilizing the claimed repair method. This slight decrease has been shown to be unnoticeable by the user in everyday operation.

Figure 2:
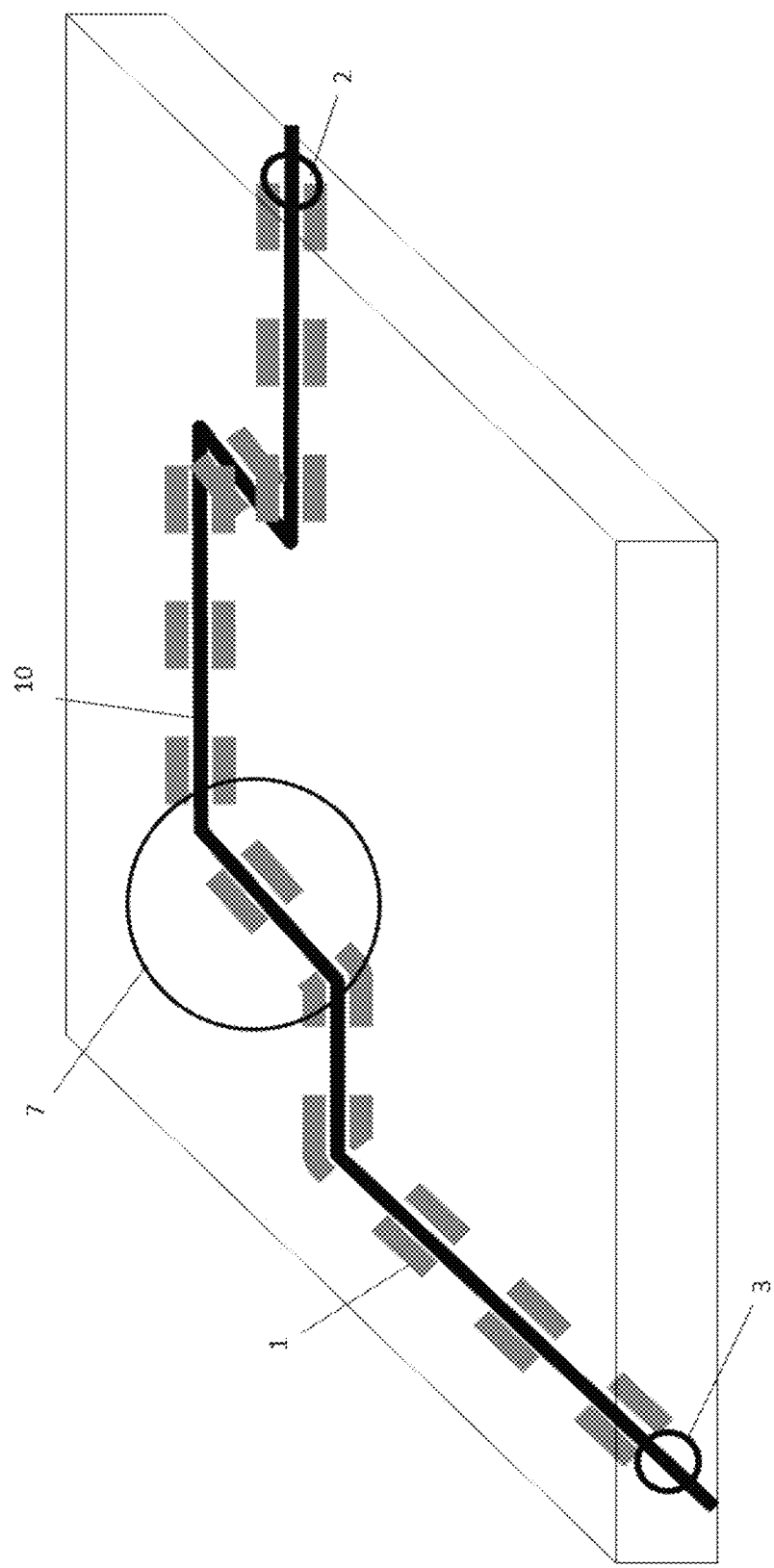
FIG. 2 depicts the tubing installed within the fluid delivery system before being molded to the inner diameter of the fluid delivery system.
Figure 6:
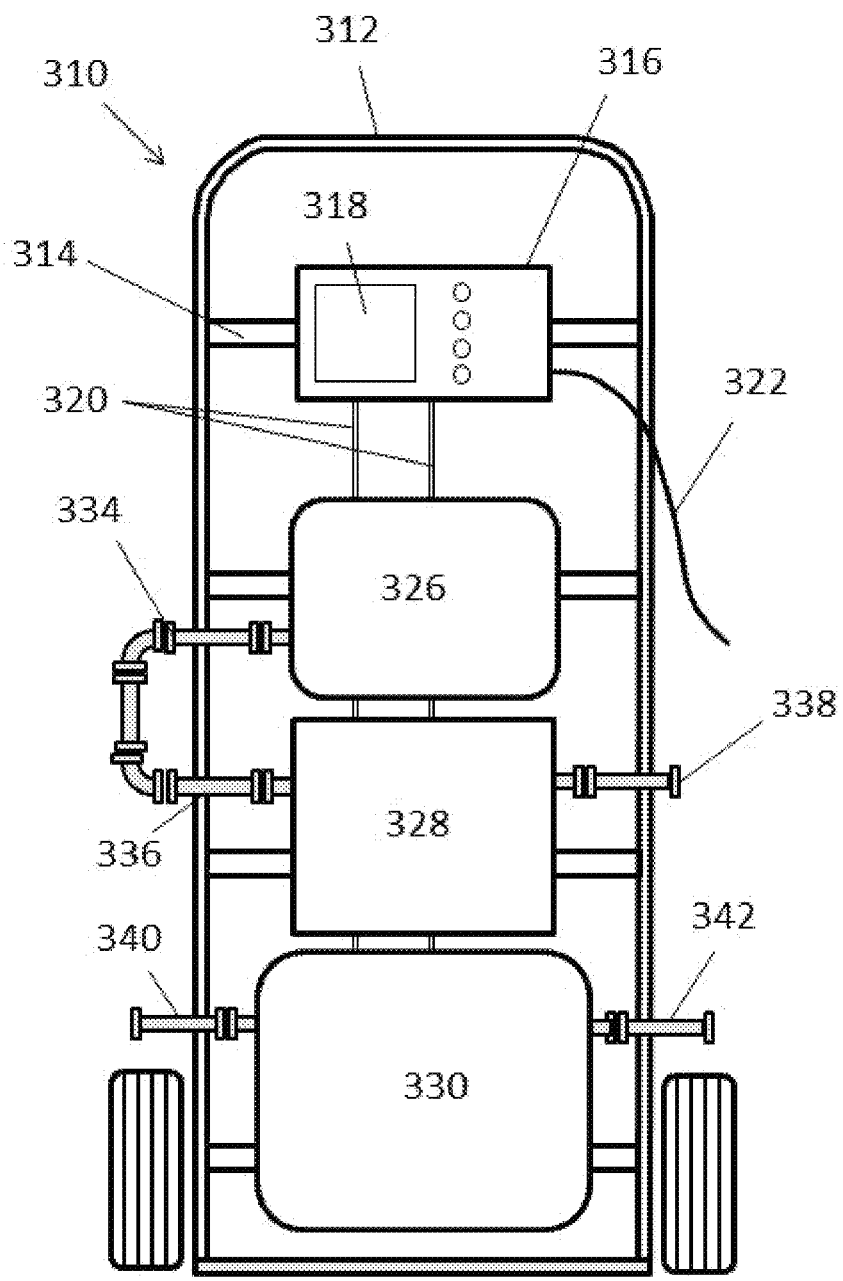
FIG. 6 depicts the fluid circulator, heater and pressurization device.

Referring to FIG. 2, the inventive tube system (10) has been inserted within existing piping system (1) so that ends of new tubing (10) has ends extending from the first and second exposed ends (2), (3) of the existing piping system (1). The target leak area is marked as pipe section (7). The invention uses a malleable thin-wall non-cross linked HDPE tube or an equivalent (10) that is inserted into a damaged and leaking fluid delivery system (1). Once in place, the tubing is connected to a source of heated and cooled water or equivalent fluid as depicted in FIG. 6. The tube (10) is sized to the inner diameter of the leaking fluid delivery system (1) being repaired by pressurizing the fluid after the liner is heated to a malleable state. In doing so all fluid pressure load is transferred to the internal wall of the existing fluid delivery system. In essence the "hoop strength" of the existing delivery system (1) supports the HDPE liner tube or substantially similar liner tube (10) increasing burst strength while strengthening the overall fluid delivery system.

Figure 3B:
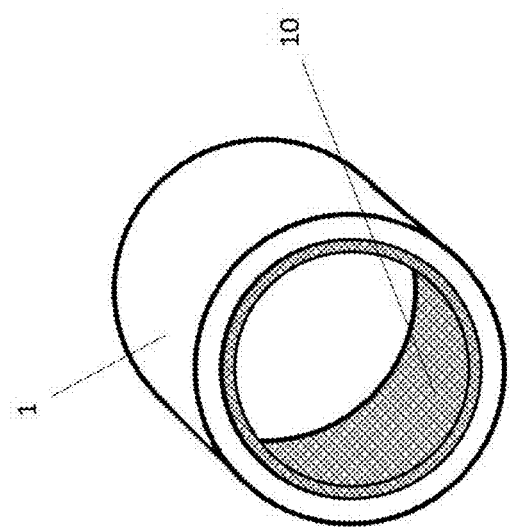
FIG. 3B depicts an enlargement of the tubing within fluid delivery system after being molded to the inner diameter of the fluid delivery system.
Figure 3A:
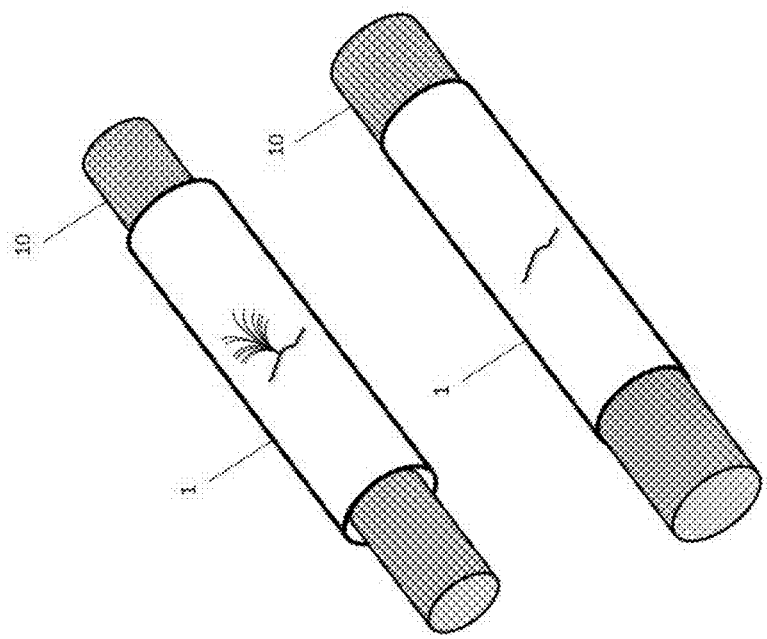
FIG. 3A depicts an enlargement of the tubing within fluid delivery system before being molded to the inner diameter of the fluid delivery system.

To install the HDPE tube or an equivalent tube liner (10) a pulling aid (referred to later as a Snake) is threaded into the fluid delivery system (1) to be repaired. Prior to this step the leaking portion of the fluid delivery system is identified and disconnected from its source and discharge. Referring to FIG. 3A, once disconnected from the source and discharge, the existing pipe (1), the inventive tubing (10) is inserted within the pipe (1) with a leak (7). FIG. 3B shows a cross-section of the inventive tubing (10) within the existing piping 1 so as to form a protective interior barrier after the inventive tubing (10) has been conformed to the I-D of the leaking pipe.

The tube liner (10) is manufactured close to outer diameter (O-D) tolerances. In the case of ½" copper tubing with an I-D of 0.545", HDPE liner is manufactured to an O-D of 0.510" to allow the HDPE to slip inside the cast-in-place underground copper tube.

Once the snake has been inserted into the fluid delivery system to be repaired, a pulling aid attachment, "a Pull Dawg", is connected to the snake. The leading end of the 0.510" HDPE tube is then heated to a malleable state along a 6"-12" section and stretched to reduce the diameter from 0.510" to 0.250" (¼") around the pulling aid "Pull Dawg" and locking it in place. Table 2 identifies the requisite size of the tube liner (10) and Pull Dawg O-D in relation to the I-D of the leaking pipe being repaired (1).

TABLE 2

Reference Chart For Sizing
Of Tube I-D and Pull Dawg O-D

| Pull Cable Diameter (inches) | Pull Dawg Attachment Diameter (inches) | Fluid Delivery System I-D and O-D (inches) |
|---|---|---|
| ⅛ | 3/16 | 0.43 and 0.5 |
| ⅛ | ¼ | 0.545 and 0.625 |
| ¼ | ⅜ | 0.668 and 0.75 |
| ¼ | ½ | 0.785 and 0.875 |

While pulling the snake at the source and feeding the HDPE liner or its equivalent (10) at the termination point, the liner (10) is inserted into the full length of the leaking fluid delivery system (1) being repaired.

Figure 4B:
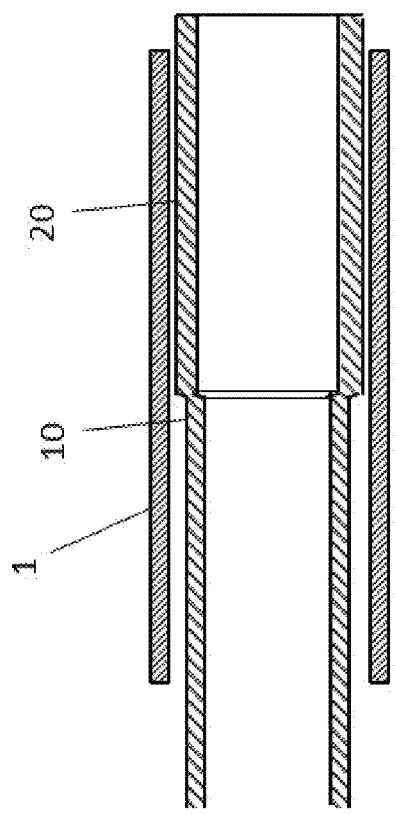
FIG. 4B depicts the tube within the fluid delivery system after it swaged to accept the barrel.

After running a length of tube liner (10) completely through the fluid delivery system (1) it is cut to leave an excess of 12". Each end of the tube liner (10), i.e., the source end and the discharge end, are swaged using a heated swaging tool to form a connection between the liner tube (10) and the pipe (1) as depicted in FIG. 4B. The liner tube (10) is swaged for a depth of 1". The liner tube (10) must be cut longer than the leaking pipe (1) because liner tuber (10) will recoil ¼" to ½". A handheld soldering iron may be modified with varying tips fabricated from brass stock. A first tip embodiment to initiate the swaging process comprises a head radius of 0.25" and a length of 1.0" which mates with the soldering iron. A second embodiment of the tip to complete the swaging process comprises a 1" shaft which tapers to a flat head comprising a face of 0.25" inches in width.

Figure 4D:
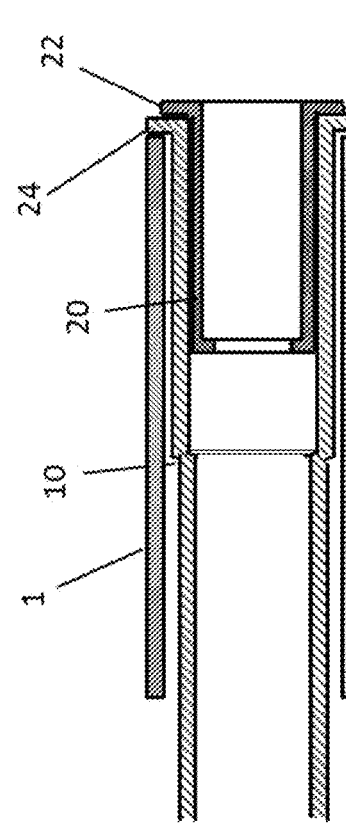
FIG. 4D depicts the fluid delivery system being repaired with liner inserted and barrel fully inserted into tubing and fluid delivery system causing the inner tube to run under the flange of the barrel.
Figure 4A:
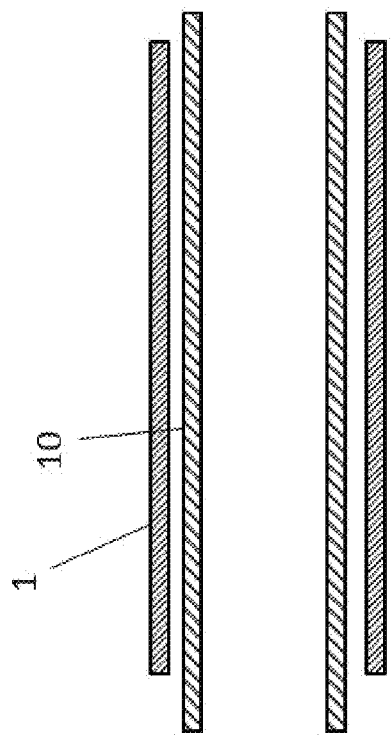
FIG. 4A depicts the liner tube within the fluid delivery system before it is swaged to accept the barrel.
Figure 4C:
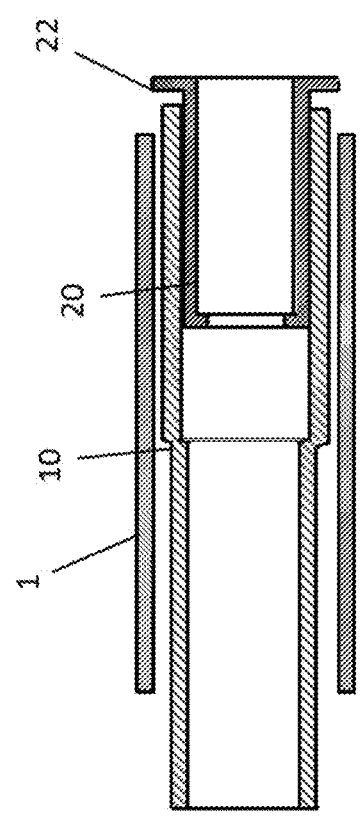
FIG. 4C depicts the fluid delivery system being repaired with liner inserted and barrel partially inserted into the liner and fluid delivery system.

Water tight connections are created at both the supply end and the discharge end of the damaged fluid delivery system (1) as depicted in FIGS. 4C through 4F. It is recommended that the first end to be manipulated to create a water tight connection is the supply end. With the liner tube (10) threaded in place and cut square to leave 12" excess at both the supply and discharge ends, a barrel (20) is inserted into the liner tube (10) at the supply location to hold the liner tube (10) in place within the delivery system (1) as depicted in FIGS. 4C and 4D. The barrel (20) may be fabricated from either stainless steel, copper, brass or engineered plastic. The inserted barrel (20) is held in place by an interference fit because the outer diameter (O-D) of the barrel (20) is larger than the inner diameter (I-D) of the tubing liner (10). Referring to FIG. 4D, the liner tube (10) and barrel (20) is nested in its final position causing the end of the inner tube to roll forming a flange (24) beneath the flange of the flange (22) of the barrel (20). Once the barrel (20) has been inserted into the tubing liner tube (10), the tubing liner is pulled from the opposite end, the discharge end, to make flush with the delivery system (1) being repaired.

Next, the water tight connection at the discharge side of delivery system being repaired is created as follows. First, the excess liner tube protruding from the fluid delivery system discharge end is firmly pushed back into the system until resistance is felt. Second, at the point of resistance, the tube is cut flush with the system tube (1). Upon releasing the tube (10), it will recoil ¼" to ½" outward from the delivery system tube (1). Third, swage the liner tube (10) at the discharge end within the delivery system tube (1) as depicted in FIG. 4B. Fourth, create the water tight connection by inserting the barrel (20) into the tube (10) to create an interference fit with delivery system (1) as depicted in FIGS. 4C through 4D. The appropriate sized compression fitting and barrel may be selected from the dimensions set forth in Table 1.

Figure 4F:
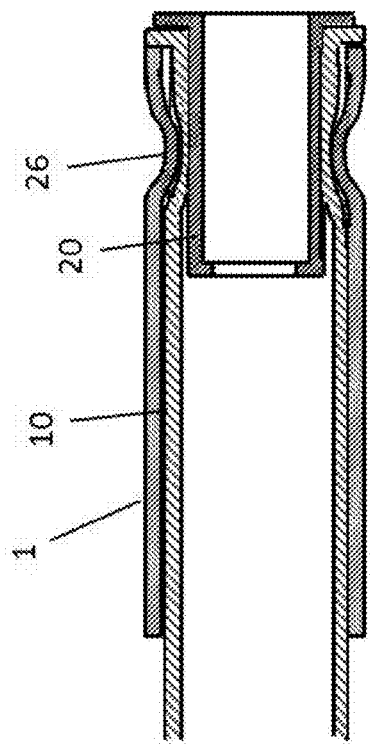
FIG. 4F depicts the fluid recovery system and liner being crimped to the barrel.
Figure 4E:
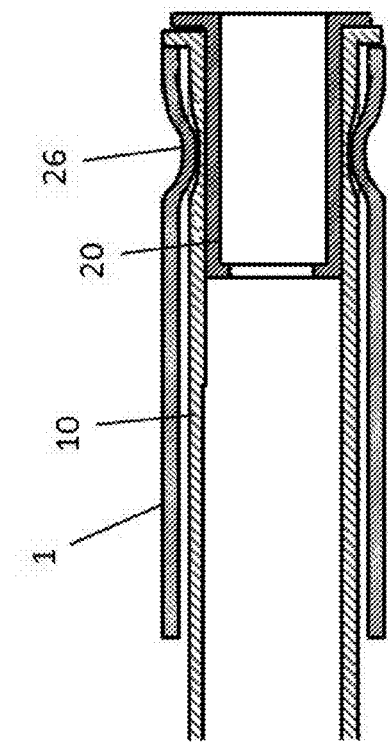
FIG. 4E depicts the fluid recovery system and liner being crimped to the barrel.

Upon installation of the liner tube (10) and barrels (20) in the source and discharge ends of the delivery system (1), the delivery system (1) and liner tube (10) are crimped against barrel (20) to locate the assembly components in place, and create a mechanical interference to prevent any fluid from traversing its way back into delivery system (1) by overcoming flange (22) on barrel (20) as depicted in FIGS. 4E and 4F. The crimping may be effectuated using a modified tube cutter (210) as depicted in FIGS. 5A and 5B. The crimping tool comprises a support body (212) having a generally L-shaped configuration. The body of the crimping tool comprising a main portion and a roller support portion (218), the roller support portion configured so as to support at least one backing roller against pressure applied to the roller during use. An adjustable member (214) for supporting a crimping roller (220) thereon, the adjustable member being configured so as to permit a user to move the adjustable member in a forward and rearward direction to bring at least one backing roller and the crimping roller closer or farther apart, respectively. The adjustable member is further configured to form a space relative to the roller support portion to permit a pipe to be crimped to reside in the space, the crimping roller comprising a hard material sufficient to crimp piping that resides in the space. The crimping wheel (220) which has an enlarged radius to prevent cutting the delivery system pipe. The crimping too (210) may be applied to the pipe residing in a space in a rotating fashion, with the adjustable member being adjusted by the user so as to bring the crimping roller sequentially closer to the at least one backing roller.

Referring to FIG. 6, a fluid circulator, heater and pressurization device (310) is connected to the fluid delivery system at the source and discharge points. The a fluid circulator, heater and pressurization device (310) resides upon a wheeled system transport (312) possessing equipment mounts (314) to mount the equipment. The equipment comprises a controller (316) with a display panel (318), a power cord (322), and a control cable (320) to communicate with the compressor (326) which pressurizes the water flowing through the water heater (328) via conduit 334. The water heater has an outlet (338) for discharging the pressurized heated water. The device (310) further comprises a water chiller (330) with an inlet (340) and outlet (342).

Preheated water or other equivalent fluid is cycled through repaired system until a temperature of 212-240 degrees Fahrenheit has been achieved to render the liner tube (10) malleable and formable to the I-D of the delivery system (1). Once the requisite temperature is reached to mold the liner tube (10), the liner tube (10) nested in the delivery system (1) is pressurize to 60 to 100 p.s.i for approximately 90 seconds to expand and mold liner tube (120) to the I-D of the delivery system (100) as depicted in FIG. 3B. The pressurized fluid is then cooled to ambient temperature while maintaining pressure to fix the liner tubing (10) to the I-D of the delivery system (1).

The mobile test apparatus depicted in FIG. 6 is disconnected, and residual fluid in the repaired delivery system (1) is evacuated by injecting clean compressed air and performing a clear water flush. The source end (2) and discharge end (3) of the delivery system are reconnected at the points of disconnection to permit resumption of operation of the fluid discharge system after repair of the leak.

Another benefit of the claimed method is that all components used can be inspected and tested prior to installation. The end user (customer) can inspect the individual components used in the process prior to installation.

Unlike the claimed method, the pipe coating process uses a liquid polymer media that is injected under heat and pressure and is completely reliant on strict process control to net a successful result. It is currently unknown how much pressure and volume can be affected by this process but it would be assumed to cause substantial loss because of the distance the material must travel during the procedure and the time, temperature and pressure of the material prior to the exothermic event (curing or hardening).

Another area for comparison with the prior art would be pre-process preparation of the supply lines to be treated. The claimed method only requires a light blow out with compressed air and the insertion of the pulling aid (snake). Liquid pipe coating requires several critical steps to prepare the internal surfaces of the supply tubes to be treated and are comprised of the following: Remove all mixing valves, angles stops and faucets in the residence and loop the hot and cold water lines at these stations, isolate the hot water heater, as it will not be treated. Hook up liquid polymer dispensing machines for optimum points of injection of liquid polymer. Abrasive blast the pipes to be treated with abrasive media. Purge the abrasive media from the pipe. Liquid nitrogen (LN2) is injected to rid tubes of all contaminates that would affect the liquid polymer from adhering to the tube inner wall. Injection of the liquid polymer must take place within the strictest guidelines after purging the pipes. Failure to meet these guidelines requires the user to repeat the step of injecting the liquid polymer because oxides form immediately after LN2 purge/clean. As shown the pipe coating process requires multiple preparation steps before the actual coating can be applied. Multiple process steps increase the risk of failure due complexity which directly impacts the cost. The claimed method requires no special preparation and can be conducted and completed in a fraction of the time it requires to coat pipes with liquid polymer making the claimed method a superior process and better value.

The claimed method may be repaired if leak should develop in the future despite being previously repaired using the claimed method. In comparison, pipe coating is a permanent addition to the tube internal surface and in the event a future leak, special steps must be taken so as not to destroy the applied coating while conducting a repair. The claimed method allows removal of the thin wall HDPE liner (10) and replacing it with a new liner using the same simple process steps. To remove a later damaged liner requires the removal of the connections at the source (2) and discharge (3) locations of the system, a capping or plugging of one end of the tube, and the application of a light vacuum to collapse the tubing upon itself thereby allowing the liner to be simply extracted by pulling it out of previously repaired supply tube. The tube is then prepared and made ready to accept a new thin wall HDPE liner or equivalent liner (10).

I claim:

1. A device for semi-permanently sealing a leaking fluid delivery system, the device comprising: a first length of generally cylindrical resilient tubing configured to be delivered through at least a portion of the fluid delivery system, the tubing comprising a material that permits delivery at a first diameter and application to an interior wall of the at least a portion of the fluid delivery system at a second diameter, the material configured to undergo a change from the first diameter to the second diameter when exposed to temperature and pressure gradients, and further configured to undergo a change from the second diameter to a third diameter when exposed to reduced pressure to enable removal of the cylindrical resilient tubing from the fluid delivery system;

a first barrel with a top flange to secure a first end of the tubing to a first end of the at least a portion of the fluid delivery system; and a first crimp to secure the first barrel and the first end of the tubing within the first end of the at least a portion of the fluid delivery system.

2. The device of claim 1 further comprising a second barrel with a top flange to secure a second end of the tubing to a second end of the at least a portion of the fluid delivery system; and a second crimp to secure the second barrel and the second end of the tubing within the second end of the at least a portion of the fluid delivery system.

\* \* \* \* \*